United States Patent
Hirose et al.

(10) Patent No.: US 11,448,809 B2
(45) Date of Patent: *Sep. 20, 2022

(54) MULTI-LAYER LAYERED FILM

(71) Applicant: TOYOBO CO., LTD., Osaka (JP)

(72) Inventors: Amane Hirose, Tokyo (JP); Nobuyuki Nakanishi, Tokyo (JP); Mitsuo Tojo, Tokyo (JP); Dai Nakagawa, Tokyo (JP)

(73) Assignee: TOYOBO CO., LTD., Osaka (JP)

(*) Notice: Subject to any disclaimer, the term of this patent is extended or adjusted under 35 U.S.C. 154(b) by 433 days.

This patent is subject to a terminal disclaimer.

(21) Appl. No.: 16/498,024

(22) PCT Filed: Mar. 29, 2018

(86) PCT No.: PCT/JP2018/013505
§ 371 (c)(1),
(2) Date: Sep. 26, 2019

(87) PCT Pub. No.: WO2018/181841
PCT Pub. Date: Oct. 4, 2018

(65) Prior Publication Data
US 2020/0025991 A1  Jan. 23, 2020

(30) Foreign Application Priority Data
Mar. 31, 2017 (JP) .............................. JP2017-071191

(51) Int. Cl.
*G02B 5/30* (2006.01)
*G02F 1/1335* (2006.01)
(Continued)

(52) U.S. Cl.
CPC ............ *G02B 5/3083* (2013.01); *B32B 27/08* (2013.01); *B32B 27/36* (2013.01); *G02B 5/287* (2013.01);
(Continued)

(58) Field of Classification Search
CPC ................... G02B 5/3083; G02B 5/30; G02B 5/3025–305; G02B 5/28; G02B 5/285;
(Continued)

(56) References Cited

U.S. PATENT DOCUMENTS 9,213,129 B2* 12/2015 Han ...................... G02B 5/285
2019/0322087 A1* 10/2019 Nakagawa .............. B32B 27/08
(Continued)

FOREIGN PATENT DOCUMENTS

JP 04-268505 A 9/1992
JP 09-506837 A 7/1997
(Continued)

OTHER PUBLICATIONS

Li et al., "Design Optimization of Reflective Polarizers for LCD Backlight Recycling", Journal of Display Technology, vol. 5, No. 8, Aug. 2009, pp. 335-340 (Year: 2009).*
International Search Report for PCT/JP2018/013505, dated May 1, 2018.
Notification of Reason for Refusal dated Nov. 29, 2021 from the Korean Intellectual Property Office in KR application No. 10-2019-7028360.

*Primary Examiner* — Stephone B Allen
*Assistant Examiner* — Adam W Booher
(74) *Attorney, Agent, or Firm* — Sughrue Mion, PLLC (57) ABSTRACT

A multi-layer, layered film includes a multi-layer, alternately layered body containing birefringent first layers including a first resin and isotropic second layers including a second resin, in which the multi-layer, layered film has a layer thickness profile with which light at a wavelength of from 380 to 780 nm can be reflected due to optical interference between each of the first layers and each of the second layers, in which a layer thickness profile for an optical thickness of the first layers has a first monotonically increasing region which meets specific requirements, and in which a layer thickness profile for an optical thickness of the second layers has a second monotonically increasing region which meets specific requirements.

8 Claims, 1 Drawing Sheet

(51) Int. Cl.
    *G02F 1/13357*     (2006.01)
    *B32B 27/08*     (2006.01)
    *B32B 27/36*     (2006.01)
    *G02B 5/28*     (2006.01)

(52) U.S. Cl.
    CPC ......... *G02B 5/305* (2013.01); *G02F 1/13362* (2013.01); *G02F 1/133536* (2013.01)

(58) Field of Classification Search
    CPC .... G02B 5/287; G02B 5/0841; G02B 5/0883; B32B 27/08; B32B 27/36; B32B 3/263; B32B 7/023; B32B 2307/42; G02F 1/133536; G02F 1/13362; G02F 1/133545
    See application file for complete search history.

(56) References Cited

U.S. PATENT DOCUMENTS

| | | | | |
|---|---|---|---|---|
| 2021/0349246 | A1* | 11/2021 | Nakagawa | G02B 5/287 |
| 2021/0349247 | A1* | 11/2021 | Nakagawa | B32B 3/263 |
| 2021/0349249 | A1* | 11/2021 | Nakagawa | G02B 27/286 |

FOREIGN PATENT DOCUMENTS

| | | | |
|---|---|---|---|
| JP | 09-506984 | A | 7/1997 |
| KR | 10-2014-0088563 | A | 7/2014 |
| WO | 01/47711 | A1 | 7/2001 |
| WO | 2013/059228 | A1 | 4/2013 |

* cited by examiner

MULTI-LAYER LAYERED FILM

CROSS REFERENCE TO RELATED APPLICATIONS

This application is a National Stage of International Stage Application No. PCT/JP2018/013505 filed Mar. 29, 2018, claiming priority based on Japanese Patent Application No. 2017-071191 filed Mar. 31, 2017.

TECHNICAL FIELD

The present disclosure relates to a multi-layer, layered film capable of widely reflecting light in a visible light range.

BACKGROUND ART

A multi-layer, layered film in which many layers with a low refractive index and many layers with a high refractive index are alternately layered can be an optical interference film that selectively reflects or transmits light with a specific wavelength by structural light interference between layers. Further, by gradually changing the film thickness of each layer along the thickness direction or by pasting films having different reflection peaks, the multi-layer, layered film as described above can reflect or transmit light over a wide wavelength range, can also obtain a reflectance as high as a film using metal, and can also be used as a metallic luster film or a reflective mirror. Moreover, it is known that by stretching such a multi-layer, layered film in one direction, the multi-layer, layered film can also be used as a reflective polarizing film that reflects only a specific polarization component and can be used as a brightness improving member for liquid crystal displays, and the like (Patent Documents 1 to 4, etc.).

These multi-layer, layered films are often required to have a higher reflectance in a freely selected wavelength range. However, since the number of layers to be layered is limited, it is very difficult to also achieve a high reflectance in a case where the reflection wavelength range is broad. In addition, increasing only the reflectance of a specific wavelength range might lead to a decrease in reflectance of other reflection wavelength ranges, causing an optical quality problem.

CITATION LIST

Patent Document

Patent Document 1: Japanese Patent Application Laid-Open (JP-A) No. H04-268505
Patent Document 2: Japanese National-Phase Publication (JP-A) No. H09-506837
Patent Document 3: Japanese National-Phase Publication (JP-A) No. H09-506984
Patent Document 4: International Publication No. 01/47711 Pamphlet

SUMMARY OF INVENTION

Technical Problem

The present inventors have found and focused on that, when the multi-layer, layered film has thickness spots, it is difficult to visually recognize the thickness spots at normal incidence, but when the film is observed from an oblique direction, color unevenness in a striped shape or mottled shape, or in a shape similar thereto, occurs more significantly. The inventors have found that this is particularly likely to occur in a uniaxially stretched multi-layer, layered film, such as one used for a reflective polarizing film. In the uniaxially stretched film, spots in such a striped shape as to have bands in the stretching direction tend to occur, and in a biaxial stretched film, spots in a mottled shape tend to occur. In order to reduce such color unevenness that occurs when the film is observed from the oblique direction as described above, it is conceivable to extend a reflection band to a longer wavelength side, but this leads to a decrease in reflection intensity of a specific reflection wavelength as described above. Although it is ideal to eliminate the thickness spots, when resin or film forming conditions for obtaining favorable thickness spots are selected, it becomes difficult to obtain required optical properties, for example, it becomes difficult to obtain a high degree of polarization and reflectance.

Therefore, it is an object of one embodiment of the present invention to provide a multi-layer, layered film which has a high reflectance and in which, even when there are thickness spots to some extent, color unevenness caused by the thickness spots is difficult to recognize visually.

Solution to Problem

As a result of intensive studies to solve the above problem, the inventors have found that by separately controlling layer thickness profiles of a birefringent layer and an isotropic layer in a multi-layer alternately layered body, or by controlling the slope of the layer thickness profile for the birefringent layer and the slope of the layer thickness profile for the isotropic layer in a specific range and combining these, an unexpected effect that color unevenness is significantly reduced is exerted, to complete the invention.

The invention includes the following aspects.

1. A multi-layer, layered film including
a multi-layer, alternately layered body containing birefringent first layers including a first resin and isotropic second layers including a second resin,
   wherein the multi-layer, layered film has a layer thickness profile with which light at a wavelength of from 380 to 780 nm can be reflected due to optical interference between each of the first layers and each of the second layers,
   wherein a layer thickness profile for an optical thickness of the first layers has a first monotonically increasing region, the first monotonically increasing region including a 1A monotonically increasing region with a maximum optical thickness of up to 100 nm and a 1B monotonically increasing region with a minimum optical thickness of over 100 nm,
   wherein a ratio 1B/1A of a slope 1B in the 1B monotonically increasing region to a slope 1A in the 1A monotonically increasing region is from 0.8 to 1.5,
   wherein a layer thickness profile for an optical thickness of the second layers has a second monotonically increasing region, the second monotonically increasing region including a 2A monotonically increasing region with a maximum optical thickness of up to 200 nm and a 2B monotonically increasing region with a minimum optical thickness of over 200 nm, and
   wherein a ratio 2B/2A of a slope 2B in the 2B monotonically increasing region to a slope 2A in the 2A monotonically increasing region is from 5 to 10.

2. The multi-layer, layered film described in 1 above, wherein an average optical thickness in the 1A monotonically increasing region is from 75 to 95 nm, and an average optical thickness in the 1B monotonically increasing region is from 120 to 140 nm.

3. The multi-layer, layered film described in 1 or 2 above, wherein an average optical thickness in the 2A monotonically increasing region is from 140 to 165 nm, and an average optical thickness in the 2B monotonically increasing region is from 250 to 290 nm.

4. The multi-layer, layered film described in any of 1 to 3 above, wherein the ratio 1B/1A is from 1.0 to 1.5.

5. The multi-layer, layered film described in any of 1 to 4 above, wherein an average reflectance in a wavelength range of from 380 nm to 780 nm of light polarized parallel to a reflection axis at normal incidence is 85% or more.

Advantageous Effects of Invention

According to one embodiment according to the invention, it is possible to provide a multi-layer, layered film having a high reflectance while reducing color unevenness caused by thickness spots.

DESCRIPTION OF EMBODIMENTS

[Multi-Layer, Layered Film]

A multi-layer, layered film according to one embodiment according to the invention contains a multi-layer, alternately layered body of birefringent first layers mainly made of a first resin and isotropic second layers mainly made of a second resin. In a visible light range with a visible light range of from 380 to 780 nm, light can be reflected in a wide wavelength range by the effect of light interference between the first layers and the second layers. Light can be reflected, for example, in a wavelength range of from 400 to 760 nm, and light can be reflected preferably in a wavelength range of from 380 to 780 nm. In the disclosure, "can be reflected" means that in at least one freely selected direction in the film surface, the average reflectance at perpendicular incidence of polarized light parallel to the direction is 50% or more. This reflection, as the average reflectance in each wavelength range, only needs to be 50% or more and is preferably 60% or more, and more preferably 70% or more.

In the disclosure, the average reflectance is a value obtained by subtracting the average transmittance at the wavelength of from 380 to 780 nm from 100, obtained using a polarizing film measurement apparatus ("VAP7070S", manufactured by JASCO Corporation).

In the disclosure, "mainly made of" means that in each layer, the resin accounts for 70% by mass or more with respect to the total mass of each layer, preferably 80% by mass or more, and more preferably 90% by mass or more.

In order to obtain such reflection properties, the multi-layer, alternately layered body preferably has a structure in which a total of 30 or more birefringent first layers and isotropic second layers are alternately layered in the thickness direction, the first layers being mainly made of the first resin and having a film thickness of from 10 to 1000 nm, the second layers being mainly made of the second resin and having a film thickness of from 10 to 1000) nm. The resins constituting the respective layers, which will be described in detail later, are not particularly limited so long as being able to form the birefringent layer or the isotropic layer. Either resin is preferably a thermoplastic resin from the viewpoint of easy production of the film. In the disclosure, for refractive indexes in the vertical direction, the horizontal direction, and the thickness direction, those having a difference of 0.1 or more between the maximum and the minimum are taken as birefringent, and those having a difference of less than 0.1 are taken as isotropic.

[Thickness Spots]

In the disclosure, thickness spots are preferably represented by an R value (%) in accordance with the following Formula 1.

$$R \text{ value (\%)} = \frac{R_{max} - R_{min}}{R_{ave}} \times 100 \quad \text{(Formula 1)}$$

In Formula 1, Rmax and Rmin respectively represent the maximum value and the minimum value of the thickness of the film with respect to the axial direction (which may be the vertical direction, the longitudinal direction, or MD) of a film forming machine. Moreover, Rave means the average value of the thickness of the film with respect to the axial direction of the film-forming machine.

In the multi-layer, layered film of one embodiment according to the invention, for example, thickness spots are 0.5% or more in R value. For reducing the color unevenness, there are preferably no thickness spots, but it is practically very difficult to eliminate the thickness spots. Under such circumstances, according to one embodiment according to the invention, even when there are thickness spots to some extent, the effect of reducing the color unevenness is exhibited. According to one embodiment according to the invention, even when the R value of the thickness spots is, for example, 1.0% or more or 1.5% or more, the color unevenness can be reduced.

[Layer Thickness Profile]

The multi-layer, layered film of one embodiment according to the invention can reflect light in a wide wavelength range by having the first layers and the second layers with various optical thicknesses. This is because the reflection wavelength is attributed to the optical thickness of each layer constituting the multi-layer, layered film. In general, the reflection wavelength of the multi-layer, layered film is represented by the following Formula 2.

$$\lambda = 2(n1 \times d1 + n2 \times d2) \quad \text{(Formula 2)}$$

In Formula 2, λ represents a reflection wavelength (nm), n1 and n2 represent the refractive indexes of the respective layers, and d1 and d2 represent the physical thicknesses (nm) of the respective layers.

Further, an optical thickness λM(nm) is represented by the product of a refractive index nk and a physical thickness dk of each layer as in the following Formula 3. For the physical thickness here, one obtained from a photograph taken with a transmission electron microscope can be employed.

$$\lambda M(nm) = nk \times dk \quad \text{(Formula 3)}$$

In view of the above, it is possible to obtain a layer thickness profile with which light can be widely reflected at the wavelength of from 380 to 780 nm. For example, light in a wide wavelength range can be designed to be reflected by widening the thickness range in the monotonically increasing region to be described later, or light in a wide wavelength range can be designed to be reflected as a whole by reflecting light in a specific wavelength range in the monotonically increasing region and reflecting light outside the specific wavelength range in the other region.

In one embodiment according to the invention, color unevenness can be reduced by setting the layer thickness profile for each of the first layer and the second layer to a specific aspect.

Figure 1:
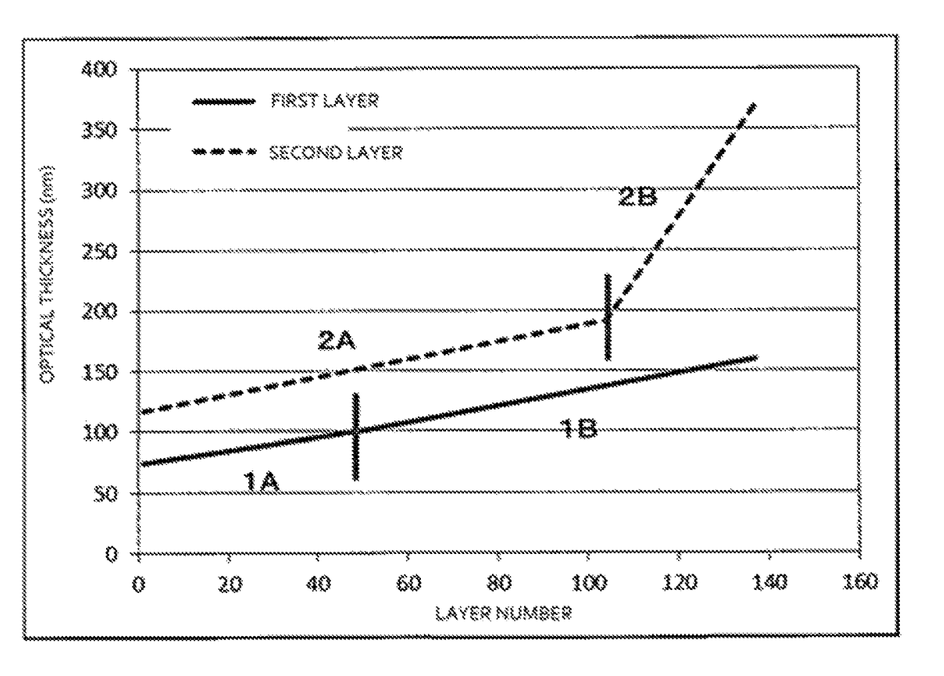
FIG. 1 is a schematic view showing an example of layer thickness profiles according to the invention.

That is, a layer thickness profile for an optical thickness of the first layers has a first monotonically increasing region, the first monotonically increasing region including a 1A monotonically increasing region with a maximum optical thickness of up to 100 nm and a 1B monotonically increasing region with a minimum optical thickness of over 100 nm, in which a ratio 1B/1A of a slope 1B in the 1B monotonically increasing region to a slope 1A in the 1A monotonically increasing region is from 0.8 to 1.5. At the same time, a layer thickness profile for an optical thickness of the second layers has a second monotonically increasing region, the second monotonically increasing region including a 2A monotonically increasing region with a maximum optical thickness of up to 200 nm and a 2B monotonically increasing region with a minimum optical thickness of over 200 nm, and a ratio 2B/2A of a slope 2B in the 2B monotonically increasing region to a slope 2A in the 2A monotonically increasing region is from 5 to 10. FIG. 1 shows a schematic view of an example of the layer thickness profiles according to the invention.

As illustrated in FIG. 1, the 1A monotonically increasing region having the slope 1A and the 1B monotonically increasing region having the slope 1B, which constitute the first monotonically increasing region, are a continuous region with an optical thickness of 100 nm as a boundary, satisfying the ratio 1B/1A of from 0.8 to 1.5. The 2A monotonically increasing region having the slope 2A and the 2B monotonically increasing region having the slope 2B, which constitute the second monotonically increasing region, are a continuous region with an optical thickness of 200 nm as a boundary, satisfying the ratio 2B/2A of from 5 to 10.

By simultaneously satisfying the range of the slope ratio 1B/1A and the range of 2B/2A, it is possible to reduce color unevenness in a striped shape or mottled shape, or in a shape similar thereto. This is because, by simultaneously satisfying the slope ratios, it is possible to achieve a multi-layer, layered film that has a higher reflectance while having a broad reflection wavelength range. Conventionally, the reflection wavelength range tends to be narrow when a high reflectance is set, but one embodiment according to the invention has a broad reflection wavelength range, whereby in the visible light range, spectral fluctuation caused by thickness spots hardly occurs, that is, the color unevenness caused by thickness spots is difficult to recognize visually.

In the disclosure, the slope of the layer thickness profile is the slope of a linear approximation straight line in accordance with the following method. That is, the slope of the linear approximation straight line of the layer thickness profile in the 1A monotonically increasing region of the first layer is taken as 1A, the slope of the linear approximation straight line of the layer thickness profile in the 1B monotonically increasing region is taken as 1B, and 1B/1A is calculated from the obtained values. Further, the slope of the linear approximation straight line of the layer thickness profile in the 2A monotonically increasing region of the second layer is taken as 2A, the slope of the linear approximation straight line of the layer thickness profile in the 2B monotonically increasing region is taken as 2B, and 2B/2A is calculated from the obtained values. In one embodiment according to the invention, it is also possible to increase the number of layers by doubling or the like as described later, but in such a case, the layer thickness profile for one packet only needs to be viewed, and this one packet can be a multi-layer alternately layered body. For example, in viewing of the layer thickness profile for the whole multi-layer, layered film, when there are a plurality of portions having similar layer thickness profiles, each portion can be regarded as a packet, and each of a multi-layered structural portion obtained by division into intermediate layers or the like can be regarded as a different packet.

Concerning the first layer, in the first monotonically increasing region, the boundary is set to an optical thickness of 100 nm, and the difference between the slope in the 1A monotonically increasing region that is a range where the optical thickness is small and the slope in the 1B monotonically increasing region that is a range where the optical thickness is large is set to a specific range, so that it is possible to uniformly improve the reflection intensity while widening the wavelength range corresponding to the first monotonically increasing region. On the other hand, when this difference in slope is out of the specific range, the improvement in reflection intensity is not uniform. Here, by setting the boundary to 100 nm, it is possible to make the reflection intensity more uniform. When the boundary of the first layer is 150 nm or 200 nm, it tends to be difficult to uniformly adjust the reflection intensity in a freely selected wavelength range.

Concerning the second layer, in the second monotonically increasing region, the boundary is set to an optical thickness of 200 nm, and the difference between the slope in the 2A monotonically increasing region that is a range where the optical thickness is small and the slope in the 2B monotonically increasing region that is a range where the optical thickness is large is set to a specific range, so that the reflection wavelength band is widened, and the color unevenness caused by thickness spots becomes difficult to recognize visually. When the slope ratio is less than the specific range, the effect of widening the reflection wavelength band tends to be small. On the other hand, in a case where the slope ratio exceeds the specific range, the reflection band is excessively widened, and the reflectance tends to decrease. Here, by setting the boundary to 200 nm and making the slope 2A relatively small in the relation between the slopes 2A and 2B, it is possible to uniformly adjust the reflection intensity Further, by making the slope 2B relatively large, it is possible to increase the reflection intensity in the target wavelength range by use of high-order reflection such as secondary reflection or tertiary reflection while widening the reflection wavelength band.

From such a viewpoint, the value of the ratio 1B/1A is preferably from 0.8 to 1.5, and for example, an aspect of 0.8, 1.0, or 1.1 as the lower limit, an aspect of 1.5, 1.4, 1.3, 1.2, or 1.0 as the upper limit, and an aspect obtained by combining freely selected lower and upper limits of these are preferred. More specifically, an aspect in a range of from 1.0 to 1.5, an aspect in a range of from 1.1 to 1.4, an aspect in a range of from 1.1 to 1.2, an aspect in a range of 0.8 or more but less than 1.0, and the like are preferred. Further, the value of the ratio 2B/2A is preferably from 5 to 10, and for example, an aspect of 5.5, 6.0, or 6.5 as the lower limit, an aspect of 8.5, 8.0, or 7.5 as the upper limit, and an aspect obtained by combining freely selected lower and upper limits of these are preferred. More specifically, an aspect in a range of from 5.5 to 8.5, an aspect in a range of from 6.0 to 8.0, an aspect in a range of from 6.5 to 7.5, and the like are preferred.

Such a layer thickness profile can be obtained by adjusting comb teeth in a feed block or by some other ways.

In the first monotonically increasing region, the slope 1A of the 1A monotonically increasing region in the range up to the optical thickness of 100 nm is preferably from 0.40 to 0.70, more preferably from 0.43 to 0.67, and still more preferably from 0.46 to 0.64. The slope 1B of the 1B monotonically increasing region in the range from the optical thickness of 100 nm is preferably from 0.56 to 0.75, more preferably from 0.58 to 0.73, and still more preferably from 0.60 to 0.71. In this manner, it is possible to further improve the effect by the slope ratio described above and to further reduce color unevenness.

In the second monotonically increasing region, the slope 2A of the 2A monotonically increasing region in the range up to the optical thickness 200 nm is preferably from 0.66 to 0.84, more preferably from 0.69 to 0.81, and still more preferably from 0.72 to 0.78. Further, the slope 2B of the 2B monotonically increasing region in the range from the optical thickness of 200 nm is preferably from 3.9 to 7.1, more preferably from 4.2 to 6.8, and still more preferably from 4.5 to 6.5. In this manner, it is possible to further improve the effect by the slope ratio described above and to further reduce color unevenness.

In the first monotonically increasing region, the optical thickness of the layer at the thinner-side end of the 1A monotonically increasing region is preferably from 61 to 79, more preferably from 63 to 77, and still more preferably from 65 to 75. The optical thickness of the layer at the thicker-side end of the 1B monotonically increasing region is preferably from 140 to 180, more preferably from 145 to 175, and still more preferably from 150 to 170. In this manner, it is possible to further improve the effect by the slope ratio described above and to further reduce color unevenness.

In the second monotonically increasing region, the optical thickness of the layer at the thinner-side end of the 2A monotonically increasing region is preferably from 104 to 126, more preferably from 107 to 123, and still more preferably from 110 to 120. In addition, the optical thickness of the layer at the thicker-side end of the 2B monotonically increasing region is preferably from 335 to 425, more preferably from 350 to 410, and still more preferably from 365 to 395. In this manner, it is possible to further improve the effect by the slope ratio described above and to further reduce color unevenness.

In the first monotonically increasing region, the average optical thickness of the first layer is preferably from 75 to 95 nm in the 1A monotonically increasing region and preferably from 120 to 140 nm in the 1B monotonically increasing region. In this manner, the effect by the layer thickness profile for the first layer as described above can be more easily exhibited, and the effect of reducing color unevenness is further improved.

In the second monotonically increasing region, the average of the second optical thickness is preferably from 140 to 165 nm in the 2A monotonically increasing region and preferably from 250 to 290 nm in the 2B monotonically increasing region. In this manner, the effect by the layer thickness profile for the second layer as described above can be more easily exhibited, and the effect of reducing color unevenness is further improved.

Furthermore, by simultaneously satisfying these, color unevenness caused by thickness spots becomes even more difficult to see, and it is possible to obtain a multi-layer, layered film showing a higher reflectance in the visible light range.

From the viewpoint of more easily exhibiting the effects described above, the averages of the optical thicknesses of the first layers in the 1A monotonically increasing region and the 1B monotonically increasing region are preferably from 77 to 93 nm and from 120 to 135 nm, respectively. The averages are more preferably from 79 to 91 nm and from 125 nm to 130 nm, respectively.

From the viewpoint of more easily exhibiting the effects described above, the averages of the optical thicknesses of the second layers in the 2A monotonically increasing region and the 2B monotonically increasing region are preferably from 143 to 162 nm and from 260 to 285 nm, respectively. The averages are more preferably from 145 to 160 nm and from 265 nm to 280 nm, respectively.

[Monotonically Increasing Region]

In the disclosure, "monotonically increasing" preferably means that the thicker-side layer is thicker than the thinner-side layer in the whole multi-layer, alternately layered body in the multi-layer, layered film but is not limited thereto, and a tendency only needs to be seen that the thickness increases from the thinner side to the thicker side in the whole view. More specifically, when the layers are numbered from the thinner side to the thicker side of the optical thickness, and the film thickness of each layer is plotted on the vertical axis with the numbered layers plotted on the horizontal axis, the layers within the range showing a tendency of an increase in film thickness are equally divided into five. In a case where the average value of the film thicknesses in each equally divided area monotonically increases in the direction in which the film thickness increases, the increase is taken as a monotonic increase, and otherwise, the increase is taken not as a monotonic increase. Note that the first layer and the second layer only need to be viewed individually, and the monotonic increase of the first layer and the monotonic increase of the second layer may have different slopes. Moreover, the monotonic increase described above may be in an aspect in which the thickness monotonically increases entirely from one outermost layer to the other outermost layer in the multi-layer, alternately layered body, but may be in an aspect in which the thickness monotonically increases in a portion that is 80% in the number of layers, or more, preferably 90% or more, more preferably 95% or more, and the thickness in the remaining portion may be constant or decrease. For example, Example 1 according to the invention is an aspect in which the thickness monotonically increases in the 100% portion, but may be an aspect in which a region is provided where the thickness does not monotonically increase to the smaller side of the layer number of the thickness profile described above and/or the larger side of the layer number.

In one embodiment according to the invention, of the monotonically increasing regions of the first layer, the region where the above-described ratio 1B/1A satisfies 0.8 to 1.5 is referred to as a "first monotonically increasing region", and of the monotonically increasing regions of the second layer, a region where the above-described ratio 2B/2A satisfies 5 to 10 is referred to as a "second monotonically increasing region."

The first layer and the second layer are alternately layered to form a multi-layer, alternately layered body, and the range of the monotonically increasing region in each of the first layer and the second layer only needs to have a range where light with a wavelength of from 380 to 780 nm can be reflected by optical interference as the multi-layer, alternately layered body. In addition, the range of the monotonically increasing region in each of the first layer and the second layer may have a width exceeding the range where light with a wavelength of from 380 to 780 nm can be reflected when the multi-layer, alternately layered body is formed.

[Configuration of Multi-Layer, Layered Film]
[First Layer]

The first layer constituting the multi-layer, layered film of one embodiment according to the invention is a birefringent layer, that is, a resin constituting this layer (also referred to as "first resin" in the disclosure) can form a birefringent layer. Therefore, as the resin constituting the first layer, an oriented crystalline resin is preferred, and polyester is particularly preferred as the oriented crystalline resin. It is preferable that the polyester contains ethylene terephthalate units and/or ethylene naphthalate units, more preferably ethylene naphthaate units, in a range of 80 mol % or more and 100 mol % or less based on the repeating units constituting the polyester because a layer having a higher refractive index can be easily formed, thereby facilitating an increase of the difference in refractive index with the second layer. Here, in the case of combined use of resins, the content is a total content.

(Polyester for First Layer)

As a preferable polyester for the first layer, a naphthalene dicarboxylic acid component is contained as a dicarboxylic acid component, and the content thereof is preferably 80 mol % or more and 100 mol % or less based on the dicarboxylic acid component constituting the polyester. Examples of this naphthalene dicarboxylic acid component include a 2,6-naphthalene dicarboxylic acid component, a 2,7-naphthalene dicarboxylic acid component, a component derived from any combination of these, and a derivative component thereof, and particularly preferable examples include a 2,6-naphthalene dicarboxylic acid component and its derivative component. The content of the naphthalene dicarboxylic acid component is preferably 85 mol % or more and more preferably 90 mol % or more, and is preferably less than 100 mol %, more preferably 98 mol % or less, and still more preferably 95 mol % or less.

As the dicarboxylic acid component constituting the polyester for the first layer, a terephthalic acid component, an isophthalic acid component, or the like may further be contained in addition to the naphthalene dicarboxylic acid component in a range not impairing the object according to the invention, and among those components, the terephthalic acid component is preferably contained. The content is preferably in a range of more than 0 mol % and 20 mol % or less. The content of this second dicarboxylic acid component is more preferably 2 mol % or more and still more preferably 5 mol % or more, and is more preferably 15 mol % or less, and still more preferably 10 mol % or less.

In the case of use as a brightness improving member or a reflective polarizing plate used for a liquid crystal display or the like, it is preferable that the first layer is a layer having relatively higher refractive index properties than the second layer, the second layer is a layer having relatively lower refractive index properties than the first layer, and the layers are stretched uniaxially. In this case, in the invention, the uniaxially stretching direction may be referred to as the "X-direction", the direction orthogonal to the X-direction in the film surface may be referred to as the "Y-direction" (also referred to as "non-stretching direction"), and the direction perpendicular to the film surface may be referred to as the "Z-direction" (also referred to as "thickness direction").

By using the polyester containing the naphthalene dicarboxylic acid component as the main component as described above for the first layer, it is possible to show a high refractive index in the X-direction and at the same time achieve birefringence index properties with a high uniaxial orientation, and it is possible to increase the difference in refractive index with the second layer in the X-direction, thus contributing to the high degree of polarization. On the other hand, when the content of the naphthalene dicarboxylic acid component is below the lower limit, amorphous properties tend to be large, and the difference between a refractive index nX in the X-direction, and a refractive index nY in the Y-direction tends to be small. Hence in the multi-layer, layered film, it tends to be difficult to obtain enough reflection performance for a P-polarization component in the invention which is defined as a polarization component parallel to the incident surface including the uniaxially stretching direction (X-direction) with the film surface as the reflection surface. In the multi-layer, layered film, an S-polarization component in the invention is defined as a polarization component perpendicular to the incident surface including the uniaxially stretching direction (X-direction), with the film surface as the reflection surface.

As a diol component constituting the preferable polyester for the first layer, an ethylene glycol component is used, and the content thereof is preferably 80 mol % or more and 100 mol % or less based on the diol component constituting the polyester, more preferably 85 mol % or more and 100 mol % or less, still more preferably 90 mol % or more and 100 mol % or less, and particularly preferably 90 mol % or more and 98 mol % or less. In a case where the proportion of the diol component is below the lower limit, the uniaxial orientation described above may be impaired.

As the diol component constituting the polyester for the first layer, in addition to the ethylene glycol component, a trimethylene glycol component, a tetramethylene glycol component, a cyclohexane dimethanol component, a diethylene glycol component, or the like may further be contained in a range not impairing the object according to the invention.

(Characteristics of Polyester for First Layer)

The melting point of the polyester used for the first layer is preferably in a range of from 220 to 290° C., more preferably in a range of from 230 to 280° C. and still more preferably in a range of from 240 to 270° C. The melting point can be obtained by measurement with a differential scanning calorimeter (DSC). When the melting point of the polyester exceeds the upper limit, the flowability may be inferior at the time of molding by melt-extrusion, and the discharge may easily be made uneven. On the other hand, when the melting point is below the lower limit, although the film forming properties are excellent, there is a tendency that the mechanical properties and the like of the polyester are easily impaired, and the refractive index properties in the case of use as the brightness improving member or the reflective polarizing plate for the liquid crystal display are hardly expressed.

The glass transition temperature of the polyester used for the first layer (hereinafter also referred to as "Tg") is preferably in a range of from 80 to 120° C., more preferably from 82 to 118° C., still more preferably from 85 to 118° C., and particularly preferably from 100 to 115° C.

With Tg is in this range, the polyester has excellent heat resistance and dimensional stability and easily expresses the refractive index properties at the time of use as the brightness improving member or the reflective polarizing plate for the liquid crystal display. The melting point and the glass transition temperature can be adjusted by controlling the type and copolymerization amount of copolymerization components and diethylene glycol which is a by-product or by some other ways.

The polyester used for the first layer preferably has an intrinsic viscosity, measured at 35° C. using an o-chlorophenol solution, of from 0.50 to 0.75 dl/g, more preferably from 0.55 to 0.72 dl/g, and still more preferably from 0.56 to 0.71 dl/g. Thereby, the polyester tends to have appropriate oriented crystallinity and tends to easily express the difference in refractive index with the second layer.

[Second Layer]

The second layer constituting the multi-layer, layered film of one embodiment according to the invention is an isotropic layer, that is, a resin constituting this layer (also referred to as "second resin" in the disclosure) can form an isotropic layer. Therefore, an amorphous resin is preferable as the resin constituting the second layer. Among the amorphous resins, amorphous polyester is preferred. Here. "amorphous" does not exclude having extremely slight crystallinity, and it is sufficient that the second layer can be made isotropic to the extent that the multi-layer, layered film according to the invention exhibits an intended function.

(Copolyester for Second Layer)

As the resin constituting the second layer, a copolyester is preferred, and in particular, it is preferable to use a copolyester containing a naphthalene dicarboxylic acid component, an ethylene glycol component, and/or a trimethylene glycol component as copolymerization components. Examples of this naphthalene dicarboxylic acid component include a 2,6-naphthalene dicarboxylic acid component, a 2,7-naphthalene dicarboxylic acid component, a component derived from any combination of these, and a derivative component thereof, and particularly preferable examples include a 2,6-naphthalene dicarboxylic acid component and its derivative component. Note that the copolymerization component in the invention means any component constituting the polyester. The copolymerization component is not limited to a copolymerization component as a sub-component (less than 50 mol % as a copolymerization amount with respect to all acid components or all diol components) but may be used including the main component (50 mol % or more as the copolymerization amount with respect to all acid components or all diol components).

In one embodiment according to the invention, as described above, it is preferable to use polyester having the ethylene naphthalate unit as the main component as the resin for the second layer, and in that case, by using the copolyester containing the naphthalene dicarboxylic acid component as the resin for the second layer, compatibility with the first layer tends to be high, interlayer adhesion to the first layer tends to be improved, and delamination hardly occurs, which is preferred.

In the copolyester for the second layer, the diol component preferably contains at least two components of the ethylene glycol component and the trimethylene glycol component. Among these, the ethylene glycol component is preferably used as the main diol component from the viewpoint of film forming properties and the like.

It is preferable that the copolyester for the second layer in one embodiment according to the invention further contains the trimethylene glycol component as the diol component. By containing the trimethylene glycol component, the elasticity of the layer structure is compensated, and the effect of reducing the delamination is enhanced.

This naphthalene dicarboxylic acid component, preferably the 2,6-naphthalene dicarboxylic acid component, is preferably 30 mol % or more and 100 mol % or less of all carboxylic acid components constituting the copolyester for the second layer, more preferably 30 mol % or more and 80 mol % or less, and still more preferably 40 mol % or more and 70 mol % or less. Thereby, the adhesion to the first layer can be further enhanced. When the content of the naphthalene dicarboxylic acid component is below the lower limit, the adhesion may be reduced from the viewpoint of compatibility. The upper limit of the content of the naphthalene dicarboxylic acid component is not particularly limited, but when the upper limit is excessively large, it tends to be difficult to express the difference in refractive index with the first layer. Note that the dicarboxylic acid components may be copolymerized in order to adjust the relation of the refractive index with the first layer.

The ethylene glycol component is preferably 50 mol % or more and 95 mol % or less of all diol components constituting the copolyester for the second layer, more preferably 50 mol % or more and 90 mol % or less, still more preferably 50 mol % or more and 85 mol % or less, and particularly preferably 50 mol % or more and 80 mol % or less. This tends to make it easier to express the difference in refractive index with the first layer.

The trimethylene glycol component is preferably 3 mol % or more and 50 mol % or less of all diol components constituting the copolyester for the second layer, more preferably 5 mol % or more and 40 mol % or less, still more preferably 10 mol % or more and 40 mol % or less, and particularly preferably 10 mol % or more and 30 mol % or less. Thereby, the interlayer adhesion to the first layer can be further enhanced. Further, the difference in refractive index with the first layer tends to be expressed easily. When the content of the trimethylene glycol component is below the lower limit, it tends to be difficult to ensure the interlayer adhesion, and when the content exceeds the upper limit, it becomes difficult to obtain a resin having a desired refractive index and glass transition temperature.

The second layer in one embodiment according to the invention may contain, as a second polymer component, a thermoplastic resin other than the copolyester within a range of 10% by mass or less based on the mass of the second layer, so long as in a range not impairing the object according to the invention.

(Characteristics of Polyester for Second Layer)

In one embodiment according to the invention, the copolyester for the second layer described above preferably has a glass transition temperature of 85° C. or more, more preferably 90° C. or more and 150° C. or less, still more preferably 90° C. or more and 120° C. or less, and particularly preferably 93° C. or more and 110° C. or less. This makes heat resistance more excellent. Further, the difference in refractive index with the first layer tends to be expressed easily. In a case where the glass transition temperature of the copolyester for the second layer is below the lower limit, the heat resistance may not be obtained sufficiently. For example, when a process such as heat treatment at around 90° C. is included, haze may increase due to crystallization or embrittlement of the second layer, and the degree of polarization may decrease at the time of use as the brightness improving member or the reflective polarizing plate. In addition, in a case where the glass transition temperature of the copolyester for the second layer is excessively high, during the film stretching, the polyester for the second layer may also have birefringence due to stretching. Accordingly, the difference in refractive index with the first layer may decrease in the stretching direction, and the reflection performance may deteriorate.

Among the copolyesters described above, amorphous copolyesters are preferred since being able to excellently reduce the increase in haze due to crystallization by heat treatment at 90° C. for 1000 hours. Here, amorphous means that a heat quantity of crystal fusion when the temperature is raised at a temperature rising rate of 20° C./min in DSC is less than 0.1 mJ/mg.

Specific examples of the copolyester for the second layer include: (1) copolyester containing 2,6-naphthalene dicarboxylic acid component as a dicarboxylic acid component and containing an ethylene glycol component and a trimethylene glycol component as diol components: and (2) copolyester containing a 2,6-naphthalene dicarboxylic acid component and a terephthalic acid component as dicarboxylic acid components and an ethylene glycol component and a trimethylene glycol component as diol components.

The intrinsic viscosity of the copolyester for the second layer measured at 35° C. using an o-chlorophenol solution is preferably from 0.50 to 0.70 dl/g, and more preferably from 0.55 to 0.65 dl/g. In a case where the copolyester used for the second layer has the trimethylene glycol component as the copolymerization component, the film forming properties may be lowered, and the film forming properties can be improved by setting the intrinsic viscosity of the copolyester to the range described above. The intrinsic viscosity in the case of using the copolyester described above as the second layer is preferably higher from the viewpoint of the film forming properties, but the difference in melt viscosity with the polyester for the second layer be larger in the range exceeding the upper limit, and the thickness of each layer may be uneven.

[Other Layers]

(Outermost Layer)

The multi-layer, layered film of one embodiment according to the invention may have the outermost layer on one or both surfaces. This outermost layer is mainly made of resin. Here, "mainly made of" means that in the layer, the resin accounts for 70% by mass or more with respect to the total mass of the layer, preferably 80% by mass or more, and more preferably 90% by mass or more. The outermost layer is preferably an isotropic layer, may be the same resin as the second layer from the viewpoint of easiness of production, and can thus be made of the copolyester for the second layer described above, and such an aspect is preferred.

(Intermediate Layer)

The multi-layer, layered film of one embodiment according to the invention may have an intermediate layer.

The intermediate layer may be referred to as an "inner thick-film layer" or the like in the invention and means a thick-film layer present inside the alternately layered configuration of the first layers and the second layers. Here, the thick film means that the film is optically thick. In the invention, the following method is preferably used: a thick-film layer (which may be referred to as "thickness adjustment layer" or "buffer layer") is formed on each side of the alternately layered configuration in the initial stage of production of the multi-layer, layered film, and then the number of layered layers is increased by doubling. In that case, two thick-film layers are layered to form an intermediate layer, the thick-film layer formed inside becomes an intermediate layer, and the thick-film layer formed outside becomes the outermost layer.

The intermediate layer, for example, has a layer thickness of preferably 5 μm or more, preferably 100 μm or less, and more preferably 50 μm or less. In a case where such an intermediate layer is provided in part of the alternately layered configuration of the first layers and the second layers, the thicknesses of the respective layers constituting the first layers and the second layers can be uniformly adjusted without affecting the polarization function. The intermediate layer may have the same composition as that of any of the first layer and the second layer, or a composition partially including these compositions, and does not contribute to the reflection properties because the layer thickness is large. On the other hand, the intermediate layer may have an influence on the transmission properties, and hence, in a case where particles are contained in the layer, the particle diameter and the particle concentration may be selected in consideration of the light transmittance.

In a case where the thickness of the intermediate layer is below the lower limit, the layer configuration of the multi-layer structure may be disturbed, and the reflection performance may be reduced. On the other hand, in a case where the thickness of the intermediate layer exceeds the upper limit, the thickness of the entire multi-layer, layered film becomes large, and it may be difficult to save space in the case of use as the reflective polarizing plate or the brightness improving member for the thin liquid crystal display. In a case where a plurality of intermediate layers are included in the multi-layer, layered film, the thickness of each intermediate layer is preferably not less than the lower limit of the above range, and the total thickness of the intermediate layers is preferably not more than the upper limit of the above range.

The polymer used for the intermediate layer may be a resin different from that for the first layer or the second layer so long as the resin can be made present in the multi-layer structure by using a method of producing the multi-layer, layered film according to the invention. However, from the viewpoint of the interlayer adhesion, the resin preferably has the composition as that of either the first layer or the second layer or a composition partially including these compositions.

A method of forming the intermediate layer is not particularly limited, but, for example, a thick-film layer is provided on each side of the alternately layered configuration before doubling, which is divided into two in the direction perpendicular to the alternately layered direction by using a branch block called a layer doubling block, and the divided layers are layered again in the alternately layered direction, so that one intermediate layer can be provided. A plurality of intermediate layers can also be provided by dividing the layer into three or four by a similar technique.

(Coated Layer)

The multi-layer, layered film of one embodiment according to the invention can have a coated layer on at least one surface.

Examples of this coated layer include a slippery layer for imparting slipperiness and a primer layer for imparting adhesiveness to a prism layer, a diffusion layer, and the like. The coated layer contains a binder component and may, for example, be made to contain particles so as to impart slipperiness. Examples of the way to impart easy adhesion include making the binder component to be used chemically close to the component of the layer to adhere. A coating solution for forming the coated layer is preferably a water-based coating solution using water as a solvent from the environmental point of view, but particularly in such a case or some other cases, a surfactant can be contained for the purpose of improving the wettability of the coating solution to the layered multi-layer film. In addition, a functional agent may be added, such as adding a crosslinking agent to increase the strength of the coated layer.

[Method of Producing Multi-Layer, Layered Film]

The method of producing the multi-layer, layered film of one embodiment according to the invention will be described in detail. Note that the production method shown below is an example, and the invention is not limited thereto. In addition, a different aspect can also be obtained with reference to the following.

The multi-layer, layered film according to one embodiment of the invention is obtained by alternately superposing polymers constituting first layers and polymers constituting second layers in a molten state by using a multi-layer feed block device, creating an alternately layered configuration having, for example, a total of 30 layers or more, with buffer layers provided on both surfaces, then dividing the alternate stack configuration having the buffer layers into, for example, two to four by using a device called layer doubling, and layering the layers again with the alternately layered configuration having the buffer layers as one block, so that the number of layered blocks (the number of doublings) becomes two to four times, thereby increasing the number of layered layers. According to this method, it is possible to obtain a multi-layer, layered film having an intermediate layer in which two buffer layers are layered inside the multi-layer structure and an outermost layer formed of one buffer layer on each surface.

This multi-layer structure is formed by layering the layers such that the thickness of each layer of the first layers and the second layers has a desired inclination structure. This can be obtained, for example, by changing intervals or lengths of slits in the multi-layer feed block device. For example, since the first layer and the second layer have different change rates of slopes in at least two optical thickness regions, also in the multi-layer feed block, the intervals or the lengths of the slits may be adjusted such that at least one or more inflection points are formed.

After a desired number of layers are layered by the method described above, the layers are extruded from a die and cooled on a casting drum to obtain a multi-layer unstretched film. The multi-layer unstretched film is preferably stretched in at least one axial direction (this one axial direction is along the film surface) of the axial direction of the film forming machine or the direction orthogonal thereto in the film surface (which may be the lateral direction, the width direction, or TD). The stretching temperature is preferably performed in a range of a glass transition temperature (Tg) to (Tg+20)° C. of the polymer of the first layer. By performing the stretching at a lower temperature than in the past, it is possible to control the orientation properties of the film to a higher degree.

A stretching ratio is preferably from 2.0 to 7.0 times, and more preferably from 4.5 to 6.5 times. Within this range, the greater the stretching ratio, the smaller the variation in the refractive index in the surface direction of each of the individual layers in the first and second layers due to the thinning by the stretching, the light interference of the multi-layer, layered film is made uniform in the surface direction, and the difference in refractive index between the first layer and the second layer in the stretching direction increases, which is preferred. As the stretching method at this time, a known stretching method may be used such as heating stretching by using a rod heater, roll heating stretching, or tenter stretching, but from the viewpoint of reduction in flaws due to contact with the roll and stretching speed, tenter stretching is preferred.

In addition, the film is also subjected to a stretching process in the direction (Y-direction) orthogonal to the stretching direction in the film surface, and in a case where biaxial stretching is performed, although depending on the use, the stretching ratio is preferably limited to about 1.01 to 1.20 times when a reflective polarization characteristic is to be imparted to the film. When the stretching ratio in the Y-direction is further increased, the polarization performance may deteriorate.

Moreover, after the stretching, the film is stretched with toe-out (re-stretching) in the stretching direction in a range of from 5 to 15% while the heat fixing is further performed at a temperature of (Tg)–(Tg+30)° C., whereby it is possible to control the orientation properties of the obtained multi-layer, layered film to a high degree.

In a case where the above-described coated layer is provided in one embodiment according to the invention, the application to the multi-layer, layered film can be carried out at any stage but is preferably carried out in the film producing process, and the application is preferably performed to a film before stretched.

Thus, a multi-layer, layered film of one embodiment according to the invention is obtained.

In a case where the film is a multi-layer, layered film to be used for the use of a metallic luster film or a reflective mirror, the film is preferably a biaxial stretched film, and in this case, either a sequential biaxial stretching method or a simultaneous biaxial stretching method may be used. The stretching ratio may be adjusted such that the refractive index and the film thickness of each layer of the first layer and the second layer exhibit desired reflection properties, but, for example, in consideration of the normal refractive index the resin constituting each of these layers, the stretching ratio may be about 2.5 to 6.5 times in both the vertical direction and the lateral direction.

EXAMPLES

Hereinafter, embodiments according to the invention will be described by way of examples, but the invention is not limited to the examples shown below. Note that physical properties and characteristics in the examples were measured or evaluated by the following methods.

(1) Thickness of Each Layer

A multi-layer, layered film was cut out to have a size of 2 mm in the film longitudinal direction and 2 cm in the width direction, fixed to an embedding capsule, and then embedded into epoxy resin (Epomount, manufactured by Refine Tec Ltd.). The embedded sample was cut perpendicularly in the width direction with a microtome (Ultracut UCT, manufactured by Leica Camera AG) into a thin film section with a 50-nm thickness. The film was observed and photographed at an accelerating voltage of 100 kV using a transmission electron microscope (Hitachi S-4300), and the thickness (physical thickness) of each layer was measured from the photograph.

Concerning layers having a thickness of more than 1 μm, the layer present inside the multi-layer structure was taken as the intermediate layer and the layer present in the outermost layer as the outermost layer, and the thickness of each layer was measured.

The optical thickness of each layer was calculated by substituting the value of the physical thickness of each layer obtained above and the value of the refractive index of each layer calculated by the following (2) into the above Formula 3. For the first layer, in the monotonically increasing region, the average optical thickness was calculated for each of a range from the optical thickness thinner-side end to 100 nm and a range from 100 nm to the thicker-side end. Similarly, for the second layer, in the monotonically increasing region, the average optical thickness was calculated for each of a range from the optical thickness thinner-side end to 200 nm and a range from 200 nm to the thicker-side end.

It can be determined whether the layer is the first layer or the second layer by the aspect of the refractive index, but in a case where that is difficult, the determination is possible based on the electronic state obtained by NMR analysis or TEM analysis.

(2) Refractive Index after Stretching in Each Direction

The individual polyesters constituting the respective layers were respectively melted and extruded from a die to respectively prepare films cast on the casting drum. In addition, a stretched film was prepared by stretching the obtained film at 120° C. in a uniaxial direction five times. For the cast film and the stretched film thus obtained, refractive indexes (respectively referred to as "nX", "nY", "nZ") in the stretching direction (X-direction), the orthogonal direction (Y-direction), and the thickness direction (Z-direction), refractive indexes at a wavelength of 633 nm, were measured and obtained using a prism couple and taken as the refractive index after stretching.

(3) Determination of Monotonic Increase

In a freely selected region of the layer thickness profile when the first layer and the second layer were individually input with the value of the optical thickness of each layer on the vertical axis and the layer number of each layer on the horizontal axis, the layers within a range showing a tendency of an increase in film thickness were equally divided into five. In a case where the average value of the film thicknesses in each equally divided area monotonically increases in the direction in which the film thickness increases, the increase was taken as a monotonic increase, and otherwise, the increase was taken not as a monotonic increase.

Here, in the monotonically increasing region of the first layer, the layer at the thinner-side end and the layer at the thicker-side end were determined, and the slope of the linear approximation straight line of the layer thickness profile in the range of from the optical thickness thinner-side end to 100 nm was taken as 1A, and the slope of the linear approximation straight line of the layer thickness profile in the range of more than 100 nm to the thicker-side end was taken as 1B. Further, in the monotonically increasing region of the second layer, the layer at the thinner-side end and the layer at the thicker-side end were determined, and the slope of the linear approximation straight line of the layer thickness profile in the range of from the optical thickness thinner-side end to 200 nm was taken as 2A, and the slope of the linear approximation straight line of the layer thickness profile in the range of more than 200 nm to the thicker-side end was taken as 2B. From these obtained values, 1B/1A and 2B/2A were calculated.

(4) Thickness Spot A strip-shaped sample was prepared by cut-out with a width of about 30 mm and a length of about 600 mm in the axial direction of the film forming machine. After the surface was wiped with alcohol and dust was collected, an electronic micrometer and a recorder (K-312A, K310B, made by Adachi Electric Co., Ltd.) were used for traveling on the film at 25 mm/s on the film to measure a thickness at a pitch of 0.25 mm in the axial direction of the film forming machine and create a graph. The maximum value, the minimum value, and the average value of the thickness of the obtained graph were taken as Rmax, Rmin, and Rave, respectively. The R value of the thickness spots was calculated by dividing the difference between Rmax and Rmin by Rave.

(5) Color Unevenness Evaluation

In a state where a film cut into 60-mm square was placed in a light box (LED Viewer Pro. FUJICOLOR) and a polarizing plate was placed on the film, the number of color-uneven stripes parallel to the axial direction of the reflection axis was counted, the stripes being seen when the film was viewed obliquely at an angle of 60 degrees from the direction in which the transmission axis was horizontal. At that time, the transmission axis of the polarizing plate was made parallel to the transmission axis of the film. Evaluations of A, B, and C were made in accordance with the number of color-uneven stripes. When the evaluation is A or B, it is recognized that the effect according to one embodiment according to the invention is exerted.

A: No color-uneven stripes
B: One or two color-uneven stripes
C: Three or more color-uneven stripes In a case where the color spots were mottled, evaluations of A, B, and C were made based on the number of color spots each having an area of 1 cm$^2$ or more when the film was viewed obliquely at 60 degrees from a freely selected direction. When the evaluation is A or B, it is recognized that the effect according to one embodiment according to the invention is exerted.

A: No color spots
B: One to three color spots
C: Four or more color spots (6) Reflection Spectrum The reflection spectrum of the obtained multi-layer, layered film was measured using a polarizing film measurement apparatus ("VAP7070S", manufactured by JASCO Corporation). For the measurement, a spot diameter adjustment mask Φ 1.4 and a deflection angle stage were used, the incident angle of measurement light was set to 0 degree, and a transmittance at each wavelength in the axis orthogonal to the transmission axis of the multi-layer, layered film determined by cross-Nicol search (650 nm) was measured at intervals of 5 nm in a range of from 380 to 780 nm. The average value of the transmittance was taken in the range of from 380 to 780 nm, and a value obtained by subtracting the average transmittance from 100 was taken as the average reflectance of the reflection axis at normal incidence. When the average reflectance was 50% or more, it was determined that reflection was possible at the reflection axis of the measured multi-layer, layered film. In the case of use for optics such as the brightness improving member, the average reflectance is 85% or more, preferably 87%6 or more, and more preferably 90% or more.

[Production Example 1] Polyester A

As polyester for the first layer, dimethyl 2,6-naphthalene dicarboxylate, dimethyl terephthalate, and ethylene glycol were subjected to transesterification in the presence of titanium tetrabutoxide, and subsequently to polycondensation reaction, to prepare copolyester (intrinsic viscosity of 0.64 dl/g) (o-chlorophenol, 35° C., the same is true with the following) in which 95 mol % of an acid component was a 2,6-naphthalene dicarboxylic acid component, 5 mol % of the acid component was a terephthalic acid component, and a glycol component was an ethylene glycol component.

[Production Example 2] Polyester B

As polyester for the second layer, dimethyl 2,6-naphthalene dicarboxylate, dimethyl terephthalate, ethylene glycol, and trimethylene glycol were subjected to transesterification in the presence of titanium tetrabutoxide, and subsequently to polycondensation reaction, to prepare copolyester (intrinsic viscosity of 0.63 dl/g) in which 50 mol % of an acid component was a 2,6-naphthalene dicarboxylic acid component, 50 mol % of the acid component was terephthalic acid component, 85 mol % of a glycol component was an ethylene glycol component, and 15 mol % of the glycol component was a trimethylene glycol component.

Example 1

After the polyester A was dried at 170° C. for five hours for the first layer, the polyester B was dried at 85° C. for eight hours for the second layer, and each polyester was supplied to each of the first and second extruders. The polyester was heated to a temperature of 300° C. to be brought into a molten state, the first layer polyester was branched into 139 layers, and the second layer polyester was branched into 138 layers. Then, the first layers and the second layers were layered alternately, and a multi-layer feed block device including comb teeth to give a layer thickness profile as shown in Table 1 was used to form a melt with a total of 277 layers in a layered state. With the layered state held, on both sides thereof, the same polyester as the polyester for the second layer was introduced from a third extruder into a three-layer feed block, to further dispose buffer layers on both sides in the lamination direction of the melt with 277 layers in the layered state (both surface layers were the first layers). The feed rate of the third extruder was adjusted such that a total of the buffer layers on both sides was 47% of the total. The layered state was further branched into two using a layer doubling block to be layered in a ratio of 1:1, to prepare an unstretched multi-layer, layered film with a total of 557 layers including an intermediate layer on the inside and two outermost layers in the outermost layer.

This unstretched multi-layer, layered film was stretched 5.9 times in the width direction at a temperature of 130° C. The thickness of the obtained uniaxially stretched multi-layer, layered film was 75 μm.

Examples 2 to 10, Comparative Examples 1 to 3

A uniaxially stretched multi-layer, layered film was obtained in the same manner as in Example 1 except that the multi-layer feed block device to be used was changed so as to obtain the layer thickness profile shown in Table 1.

TABLE 1

| | | | | | Example 1 | Example 2 | Example 3 | Example 4 | Example 5 |
|---|---|---|---|---|---|---|---|---|---|
| Layer thickness profile | First monotonically increasing region (First layer) | Layer at thinner-side end | Layer number | — | 1 | 1 | 1 | 1 | 1 |
| | | | Optical thickness | nm | 70 | 70 | 70 | 70 | 70 |
| | | Layer with 100-nm optical thickness | Layer number | — | 52 | 53 | 52 | 52 | 52 |
| | | Layer at thicker-side end | Layer number | — | 139 | 139 | 139 | 139 | 139 |
| | | | Optical thickness | nm | 157 | 152 | 167 | 157 | 157 |
| | | Average optical thickness of 1A monotonically increasing region | | nm | 88 | 88 | 88 | 88 | 88 |
| | | Average optical thickness of 1B monotonically increasing region | | nm | 127 | 126 | 134 | 127 | 127 |
| | | Slope 1A of 1A monotonically increasing region | | — | 0.54 | 0.54 | 0.54 | 0.54 | 0.54 |
| | | Slope 1B of 1B monotonically increasing region | | — | 0.67 | 0.60 | 0.76 | 0.67 | 0.67 |
| | | Slope ratio 1B/1A | | — | 1.2 | 1.1 | 1.4 | 1.2 | 1.2 |
| | Second monotonically increasing region (Second layer) | Layer at thinner-side end | Layer number | — | 1 | 1 | 1 | 1 | 1 |
| | | | Optical thickness | nm | 116 | 116 | 116 | 116 | 116 |
| | | Layer with 200-nm optical thickness | Layer number | — | 104 | 104 | 104 | 104 | 104 |
| | | Layer at thicker-side end | Layer number | — | 138 | 138 | 138 | 138 | 138 |
| | | | Optical thickness | nm | 384 | 384 | 384 | 341 | 445 |
| | | Average optical thickness of 2A monotonically increasing region | | nm | 154 | 154 | 154 | 154 | 153 |
| | | Average optical thickness of 2B monotonically increasing region | | nm | 272 | 269 | 272 | 271 | 323 |
| | | Slope 2A of 2A monotonically increasing region | | — | 0.75 | 0.75 | 0.75 | 0.76 | 0.78 |
| | | Slope 2B of 2B monotonically increasing region | | — | 5.4 | 5.4 | 5.4 | 4.2 | 7.2 |
| | | Slope ratio 2B/2A | | — | 7.2 | 7.2 | 7.2 | 5.5 | 9.2 |
| Thickness spots | | | | % | 5 | 5 | 5 | 5 | 5 |
| Can be reflected | | | | — | Yes | Yes | Yes | Yes | Yes |
| Average reflectance (380-780 nm) | | | | % | 91.7 | 91.0 | 92.4 | 90.7 | 86.0 |
| Color unevenness evaluation | | | | — | A | A | B | A | B |

TABLE 1-continued

|  |  |  |  |  | Example 6 | Example 7 | Example 8 | Example 9 | Example 10 |
|---|---|---|---|---|---|---|---|---|---|
| Layer thickness profile | First monotonically increasing region (First layer) | Layer at thinner-side end | Layer number | — | 1 | 1 | 1 | 1 | 1 |
|  |  |  | Optical thickness | nm | 70 | 76 | 70 | 70 | 70 |
|  |  | Layer with 100-nm optical thickness | Layer number | — | 52 | 52 | 52 | 52 | 52 |
|  |  | Layer at thicker-side end | Layer number | — | 139 | 139 | 139 | 139 | 139 |
|  |  |  | Optical thickness | nm | 157 | 158 | 157 | 157 | 138 |
|  |  | Average optical thickness of 1A monotonically increasing region | | nm | 85 | 88 | 88 | 88 | 88 |
|  |  | Average optical thickness of 1B monotonically increasing region | | nm | 127 | 126 | 127 | 127 | 120 |
|  |  | Slope 1A of 1A monotonically increasing region | | — | 0.61 | 0.48 | 0.54 | 0.54 | 0.54 |
|  |  | Slope 1B of 1B monotonically increasing region | | — | 0.67 | 0.67 | 0.67 | 0.67 | 0.44 |
|  |  | Slope ratio 1B/1A | | — | 1.1 | 1.4 | 1.2 | 1.2 | 0.81 |
|  | Second monotonically increasing region (Second layer) | Layer at thinner-side end | Layer number | — | 1 | 1 | 1 | 1 | 1 |
|  |  |  | Optical thickness | nm | 116 | 116 | 101 | 141 | 116 |
|  |  | Layer with 200-nm optical thickness | Layer number | — | 104 | 104 | 103 | 104 | 104 |
|  |  | Layer at thicker-side end | Layer number | — | 138 | 138 | 138 | 138 | 138 |
|  |  |  | Optical thickness | nm | 384 | 384 | 384 | 384 | 384 |
|  |  | Average optical thickness of 2A monotonically increasing region | | nm | 154 | 154 | 150 | 169 | 154 |
|  |  | Average optical thickness of 2B monotonically increasing region | | nm | 272 | 272 | 270 | 272 | 272 |
|  |  | Slope 2A of 2A monotonically increasing region | | — | 0.75 | 0.75 | 0.98 | 0.58 | 0.75 |
|  |  | Slope 2B of 2B monotonically increasing region | | — | 5.4 | 5.4 | 5.4 | 5.4 | 5.4 |
|  |  | Slope ratio 2B/2A | | — | 7.2 | 7.2 | 5.5 | 9.3 | 7.2 |
| Thickness spots | | | | % | 5 | 5 | 5 | 5 | 5 |
| Can be reflected | | | | — | Yes | Yes | Yes | Yes | Yes |
| Average reflectance (380-780 nm) | | | | % | 91.4 | 91.0 | 92.2 | 87.7 | 89.9 |
| Color unevenness evaluation | | | | — | A | A | B | B | B |

|  |  |  |  |  | Comparative Example 1 | Comparative Example 2 | Comparative Example 3 |
|---|---|---|---|---|---|---|---|
| Layer thickness profile | First monotonically increasing region (First layer) | Layer at thinner-side end | Layer number | — | 1 | 1 | 1 |
|  |  |  | Optical thickness | nm | 70 | 70 | 70 |
|  |  | Layer with 100-nm optical thickness | Layer number | — | 52 | 52 | 52 |
|  |  | Layer at thicker-side end | Layer number | — | 139 | 139 | 139 |
|  |  |  | Optical thickness | nm | 219 | 157 | 157 |
|  |  | Average optical thickness of 1A monotonically increasing region | | nm | 88 | 88 | 88 |
|  |  | Average optical thickness of 1B monotonically increasing region | | nm | 160 | 127 | 127 |
|  |  | Slope 1A of 1A monotonically increasing region | | — | 0.54 | 0.54 | 0.54 |
|  |  | Slope 1B of 1B monotonically increasing region | | — | 1.36 | 0.67 | 0.67 |
|  |  | Slope ratio 1B/1A | | — | 2.5 | 1.2 | 1.2 |

TABLE 1-continued

| | | | | | | |
|---|---|---|---|---|---|---|
| Second monotonically increasing region (Second layer) | Layer at thinner-side end | Layer number | — | 1 | 1 | 1 |
| | | Optical thickness | nm | 116 | 116 | 116 |
| | Layer with 200-nm optical thickness | Layer number | — | 104 | 104 | 104 |
| | Layer at thicker-side end | Layer number | — | 138 | 138 | 138 |
| | | Optical thickness | nm | 384 | 277 | 526 |
| | Average optical thickness of 2A monotonically increasing region | | nm | 154 | 154 | 154 |
| | Average optical thickness of 2B monotonically increasing region | | nm | 272 | 239 | 363 |
| | Slope 2A of 2A monotonically increasing region | | — | 0.75 | 0.75 | 0.79 |
| | Slope 2B of 2B monotonically increasing region | | — | 5.4 | 2.3 | 9.6 |
| | Slope ratio 2B/2A | | | 7.2 | 3.1 | 12.2 |
| Thickness spots | | | % | 5 | 5 | 5 |
| Can be reflected | | | — | Yes | Yes | Yes |
| Average reflectance (380-780 nm) | | | % | 92.2 | 92.6 | 85.4 |
| Color unevenness evaluation | | | — | C | C | C |

INDUSTRIAL APPLICABILITY

According to one embodiment according to the invention, the multi-layer, layered film according to the invention is capable of making color spots, caused by thickness spots, less visible and to achieving a higher reflectance in a wide wavelength range by appropriately designing the optical thicknesses of alternately layered birefringent layers and isotropic layers. Therefore, for example, in a case where the film is used as a brightness improving member, a reflective polarizing plate, or the like, for which polarization performance is required, since color spots cannot be seen while the film has a high degree of polarization, it is possible to provide a more reliable brightness improving member, polarizing plate for liquid crystal display, or the like.

The disclosure of Japanese Patent Application No. 2017-071191, filed Mar. 31, 2017, is incorporated in the specification by reference in its entirety.

All documents, patent applications, and technical standards described in the specification are incorporated in the specification by reference to the same extent as a case where it is specifically and individually described that individual documents, patent applications, and technical standards are incorporated by reference.

The invention claimed is:

1. A multi-layer, layered film comprising:
a multi-layer, alternately layered body containing birefringent first layers including a first resin and isotropic second layers including a second resin,
wherein the multi-layer, layered film has a layer thickness profile with which light at a wavelength of from 380 to 780 nm can be reflected due to optical interference between each of the first layers and each of the second layers,
wherein a layer thickness profile for an optical thickness of the first layers has a first monotonically increasing region, the first monotonically increasing region including a 1A monotonically increasing region with a maximum optical thickness of up to 100 nm and a 1B monotonically increasing region with a minimum optical thickness of over 100 nm,
wherein a ratio 1B/1A of a slope 1B in the 1B monotonically increasing region to a slope 1A in the 1A monotonically increasing region is from 0.8 to 1.5,
wherein a layer thickness profile for an optical thickness of the second layers has a second monotonically increasing region, the second monotonically increasing region including a 2A monotonically increasing region with a maximum optical thickness of up to 200 nm and a 2B monotonically increasing region with a minimum optical thickness of over 200 nm, and
wherein a ratio 2B/2A of a slope 2B in the 2B monotonically increasing region to a slope 2A in the 2A monotonically increasing region is from 5 to 10.

2. The multi-layer, layered film according to claim 1, wherein an average optical thickness in the 1A monotonically increasing region is from 75 to 95 nm, and an average optical thickness in the 1B monotonically increasing region is from 120 to 140 nm.

3. The multi-layer, layered film according to claim 2, wherein an average optical thickness in the 2A monotonically increasing region is from 140 to 165 nm, and an average optical thickness in the 2B monotonically increasing region is from 250 to 290 nm.

4. The multi-layer, layered film according to claim 2, wherein the ratio 1B/1A is from 1.0 to 1.5.

5. The multi-layer, layered film according to claim 1, wherein an average optical thickness in the 2A monotonically increasing region is from 140 to 165 nm, and an average optical thickness in the 2B monotonically increasing region is from 250 to 290 nm.

6. The multi-layer, layered film according to claim 5, wherein the ratio 1B/1A is from 1.0 to 1.5.

7. The multi-layer, layered film according to claim 1, wherein the ratio 1B/1A is from 1.0 to 1.5.

8. The multi-layer, layered film according to claim 1, wherein an average reflectance in a wavelength range of from 380 nm to 780 nm of light polarized parallel to a reflection axis at normal incidence is 85% or more.

* * * * *